Oct. 13, 1931.   K. WULKOW   1,827,551
STEREOISOHYPSOGRAPH
Filed July 16, 1928
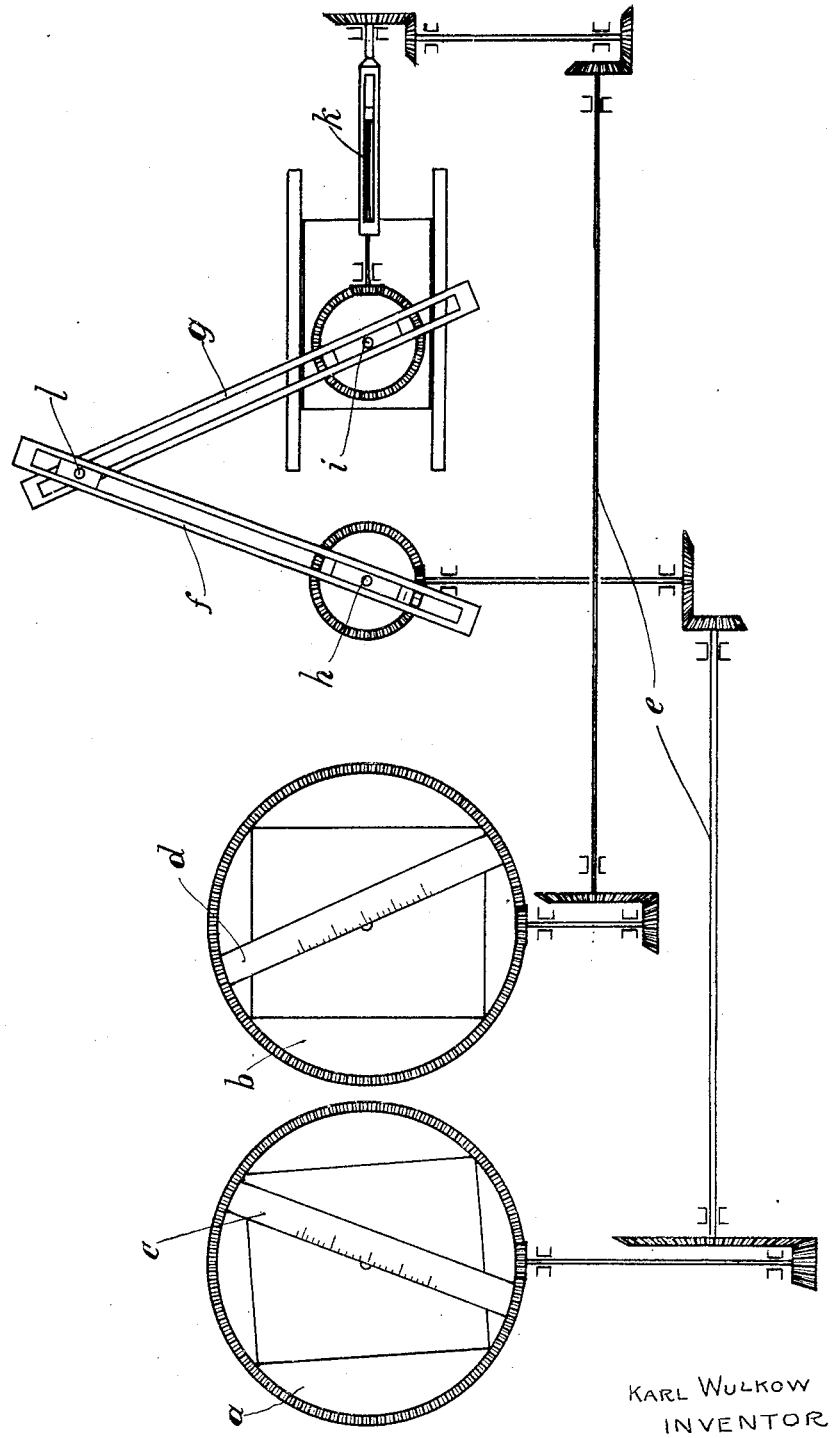
KARL WULKOW
INVENTOR Patented Oct. 13, 1931

1,827,551

UNITED STATES PATENT OFFICE

KARL WULKOW, OF BERLIN-NEUKOLLN, GERMANY, ASSIGNOR TO THE FIRM PHOTO-GRAMMETRIE G. M. B. H., OF MUNICH, GERMANY

STEREOISOHYPSOGRAPH

Application filed July 16, 1928, Serial No. 293,274, and in Germany July 28, 1927.

This invention relates to devices for the cartographic evaluation of couples of aerial photographs, which have been taken with the optical axis pointing downwards. As is known, from each such air photograph a set of directions pointing to certain points lying in the plane of the picture and starting from a suitably chosen fixed point (pole of the projection) can be selected, which is more or less exactly congruent to a set of directions pointing to the same points in the horizontal plane in nature. A couple of such direction sets, in which directions to identical points are contained, can therefore serve to use these directions, which are correlated in couples, to determine points by triangulation. The scale of a series of points determined in this manner is fixed by the distance of the centers of both direction-pencils.

The object of this invention is a device to take the plan of points and lines out of a couple of overlapping air photographs, taken with oblique or vertical optical axis pointing downwards by mechanical intersection of two directions coplanar with the photographs and starting each from a suitably chosen fixed point (pole of the projection) of each of the photos. The invention consists essentially therein that a direction ruler is arranged above or below each picture, adjustably fixed to a photo-carrier, and can be turned on an axis containing the then pole of the projection and the change of direction of which relative to the respective photo is transmitted mechanically, electrically or in any other suitable way onto a second ruler (drawing ruler), the axis of rotation of which coincides with the point of the map corresponding to the pole of the projection of the photo belonging to it. In a movement of the whole mechanism, each drawing ruler describes the same angle as the corresponding direction ruler.

A drawing device sliding simultaneously on both drawing rulers delineates the point of the country, which lies in both photos in the direction given by the respective drawing ruler in respect to the points of the country represented in both centers of projection in that certain reduced or increased scale onto the drawing surface, which is fixed by the ideal distance of the axes of both drawing rulers. In order to reproduce on any desired scale this distance has been made changeable at will, by slidably adjusting, for instance, the axis of the one drawing ruler or by letting the drawing point glide on the drawing rulers by means of two cylinders of variable distance.

I accomplish the objects of my invention by means of a device which is illustratively exemplified in a schematic way in the accompanying drawing.

Referring to the drawing, direction rulers denoted $c$ and $d$ are arranged turnably relative to both photo-carriers $a$ and $b$. The photos can be so adjusted in the photo-carriers, that the centers of the directions to be taken out, lie in the axis of the respective direction rulers. The change of direction of the direction ruler is transmitted in this form of execution by a mechanical transmission device, consisting of driving rods with spur and mitre gear onto two other rulers (drawing rulers) $f$ and $g$, the axes $h$ and $i$ of which show a variable distance to be adjusted at will. The changing and adjusting of this distance is effected by a slidable mounting having a tongue fitting in a groove in the rulers $f$ and $g$ which arrangement permits a parallel displacement of the axis $i$ in the direction towards axis $h$, without influencing the turning of the driving rod, in which it is arranged. A drawing device or a pencil $l$ slides in longitudinal grooves of both rulers $f$ and $g$, marking the respective ideal intersection of both of these rulers. If the drawing device $l$ is, for instance, guided in such a way, that the direction rulers $c$ and $d$ each go through identical points of a road shown in both photographs, then it draws on the drawing surface the plan of this road, in a scale, which is fixed by the ratio of the distance of both projection centers in nature.

In connection with the invention, the rulers of the one pair (drawing ruler) each turn in the picture plane or directly above or below same, viz. in a neighboring plane parallel to the picture plane; they rotate each around an axis which is vertical (perpendicular) to the picture plane and is not displaced with respect of same, with the swinging of the rulers. With these two rulers, a second pair of rulers (drawing rulers) is coupled, one each of which is coordinated to one of the two direction rulers. Only this second pair of rulers (drawing rulers) serves for the making of the forward section. The coordination takes place in the manner that in some way, (for instance mechanically, electrically or in some more suitable manner) the direction changes of the direction rulers are transferred in the same size to the pertinent drawing rulers. A drawing device of known construction connected with the latter attends to the transfer (in dots or lines) of the forward sections to the card plane.

What I claim as new is:—

In a device for determining the plan of points and lines from two overlapping airphotographs, the combination of a pair of ruling members, each ruling member being mounted to rotate about a fixed axis in a plane parallel with the drawing surface of one of the photographs, a second pair of ruling members remote from the first pair, means for slidably coupling the members of the second pair together, a marking device at the coupling point of the members, and means for coordinating the movements of each ruling member of the first pair with that of a corresponding member of the second pair, whereby the direction changes of the first pair of rulers are transmitted to the second pair in the same proportions.

In testimony whereof I hereunto affix my signature.

KARL WULKOW.